US007544640B2

(12) United States Patent
Luke et al.

(10) Patent No.: US 7,544,640 B2
(45) Date of Patent: Jun. 9, 2009

(54) ZEOLITE-CONTAINING TREATING FLUID

(75) Inventors: Karen Luke, Duncan, OK (US); Sears T. Dealy, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 130 days.

(21) Appl. No.: 10/623,443

(22) Filed: Jul. 18, 2003

(65) Prior Publication Data

US 2004/0108113 A1 Jun. 10, 2004

Related U.S. Application Data

(63) Continuation-in-part of application No. 10/315,415, filed on Dec. 10, 2002, now Pat. No. 6,989,057.

(51) Int. Cl.
*E21B 33/13* (2006.01)
*E21B 33/138* (2006.01)
*C09B 7/00* (2006.01)

(52) U.S. Cl. ........... 507/269; 507/207; 507/212; 507/213; 507/215; 507/216; 507/221; 507/225; 507/230; 507/242; 507/274; 166/292; 166/309

(58) Field of Classification Search ............... None
See application file for complete search history.

(56) References Cited

U.S. PATENT DOCUMENTS

| 1,943,584 | A | | 1/1934 | Cross ........................ 252/6 |
| 2,094,316 | A | * | 9/1937 | Cross et al. ................ 507/100 |
| 2,131,338 | A | | 9/1938 | Vail |
| 2,349,049 | A | | 5/1944 | Means ....................... 522/8.5 |
| 2,581,186 | A | * | 1/1952 | Green ........................ 428/323 |
| 2,662,827 | A | | 12/1953 | Clark |
| 2,727,001 | A | * | 12/1955 | Rowe ......................... 507/144 |
| 2,848,051 | A | | 8/1958 | Williams |
| 3,047,493 | A | * | 7/1962 | Rosenberg ................. 507/107 |
| 3,065,170 | A | | 11/1962 | Dumbauld et al. |
| 3,179,528 | A | | 4/1965 | Holmgreen et al. |
| 3,293,040 | A | * | 12/1966 | Shaler, Jr. et al. ........... 426/442 |
| 3,359,225 | A | | 12/1967 | Weisend |
| 3,374,057 | A | | 3/1968 | McDaniel et al. |
| 3,406,124 | A | * | 10/1968 | Eastwood et al. ............ 502/68 |
| 3,640,905 | A | | 2/1972 | Wilson |
| 3,647,717 | A | | 3/1972 | Bolton |
| 3,676,330 | A | | 7/1972 | Plank et al. |
| 3,694,152 | A | | 9/1972 | Sersale et al. .............. 423/329 |
| 3,781,225 | A | * | 12/1973 | Schwartz ................... 502/11 |
| 3,884,302 | A | | 5/1975 | Messenger |
| 3,887,385 | A | | 6/1975 | Quist et al. ................ 106/96 |
| 3,888,998 | A | * | 6/1975 | Sampson et al. ............ 426/67 |
| 3,963,508 | A | | 6/1976 | Masaryk |
| 4,031,959 | A | | 6/1977 | Henderson |
| 4,054,462 | A | | 10/1977 | Stude |
| 4,141,843 | A | | 2/1979 | Watson .................... 252/8.55 R |
| 4,199,607 | A | | 4/1980 | Sherman et al. |
| 4,217,229 | A | | 8/1980 | Watson .................... 252/8.55 R |
| 4,280,560 | A | | 7/1981 | Sydansk |
| 4,311,607 | A | | 1/1982 | Kaeser |
| 4,363,736 | A | | 12/1982 | Block |
| 4,368,134 | A | | 1/1983 | Kaeser |
| 4,372,876 | A | * | 2/1983 | Kulprathipanja et al. ...... 502/79 |
| 4,435,216 | A | | 3/1984 | Diehl et al. ............... 106/97 |
| 4,444,668 | A | | 4/1984 | Walker et al. ............. 252/8.55 R |
| 4,468,334 | A | * | 8/1984 | Cox et al. .................. 507/110 |
| 4,474,667 | A | | 10/1984 | Block |
| 4,482,379 | A | | 11/1984 | Dibrell et al. .............. 106/76 |
| 4,515,216 | A | | 5/1985 | Childs et al. |
| 4,515,635 | A | | 5/1985 | Rao et al. |
| 4,519,844 | A | | 5/1985 | Chaux et al. |
| 4,530,402 | A | | 7/1985 | Smith et al. ............... 166/291 |
| 4,536,297 | A | | 8/1985 | Loftin et al. .............. 252/8.5 C |
| 4,548,734 | A | * | 10/1985 | Chaux et al. ............... 516/53 |
| 4,548,735 | A | | 10/1985 | Bock et al. |
| 4,552,591 | A | * | 11/1985 | Millar ...................... 106/18.33 |
| 4,555,269 | A | | 11/1985 | Rao et al. |

(Continued)

FOREIGN PATENT DOCUMENTS

CA  2153372  1/1996

(Continued)

OTHER PUBLICATIONS

SPE 20624 entitled "Acidization of Analcime-Cementing Sandstone, Gulf Of Mexico", by D.R. Underdown et al., dated 1990.
SPE 39595 entitled "Designing a Remedial Acid Treatment for Gulf of Mexico Deepwater Turbidite Sands Containing Zeolite Cement", by B.A. Rogers et al., dated 1998.
Paper entitled "Tectonics, fluid migration, and fluid pressure in a Deformed forearc basin, Cook Inlet, Alaska", by R.L. Bruhn et al., pp. 550-563, dated 2000.
Paper entitled "Hydraulic Conductivity Measurement On Discrete Samples Collected From Leg 141, Site 863", by Kevin Brown, pp. 401-405, dated 1995.

(Continued)

*Primary Examiner*—James Seidleck
*Assistant Examiner*—John J Figueroa
(74) *Attorney, Agent, or Firm*—Craig W. Roddy; Haynes & Boone, L.L.P.

(57) ABSTRACT

Methods and compositions are provided for treating fluids, especially spacer fluids and cement compositions as well as drilling, completion and stimulation fluids including, but not limited to, drilling muds, well cleanup fluids, workover fluids, conformance fluids, gravel pack fluids, acidizing fluids, fracturing fluids and the like for introduction into a subterranean zone penetrated by a wellbore, wherein the treating fluid comprises zeolite and a carrier fluid. The treating fluid may additionally include one or more of a viscosifier, organic polymer, dispersants, surfactants and weighting materials.

34 Claims, No Drawings

U.S. PATENT DOCUMENTS

| | | | | |
|---|---|---|---|---|
| 4,557,763 | A | 12/1985 | George et al. | |
| 4,632,186 | A | 12/1986 | Boncan et al. | |
| 4,650,593 | A * | 3/1987 | Slingerland | 507/107 |
| 4,652,391 | A | 3/1987 | Balk | |
| 4,676,317 | A | 6/1987 | Fry et al. | |
| 4,703,801 | A | 11/1987 | Fry et al. | |
| 4,717,488 | A | 1/1988 | Seheult et al. | 252/8.551 |
| 4,721,633 | A | 1/1988 | Baldassin | |
| 4,772,307 | A * | 9/1988 | Kiss et al. | 71/13 |
| 4,784,693 | A | 11/1988 | Kirkland et al. | |
| 4,802,921 | A | 2/1989 | Motoki | |
| 4,818,288 | A | 4/1989 | Aignesberger et al. | |
| 4,818,518 | A | 4/1989 | Gioffre et al. | |
| 4,888,120 | A * | 12/1989 | Mueller et al. | 507/227 |
| 4,943,544 | A | 7/1990 | McGarry et al. | 501/124 |
| 4,986,989 | A * | 1/1991 | Sirosita et al. | 424/635 |
| 5,121,795 | A | 6/1992 | Ewert et al. | |
| 5,123,487 | A | 6/1992 | Harris et al. | |
| 5,125,455 | A | 6/1992 | Harris et al. | |
| 5,127,473 | A | 7/1992 | Harris et al. | |
| 5,151,131 | A | 9/1992 | Burkhalter et al. | |
| 5,238,064 | A | 8/1993 | Dahl et al. | |
| 5,252,554 | A | 10/1993 | Mueller et al. | |
| 5,301,752 | A | 4/1994 | Cowan et al. | |
| 5,307,876 | A | 5/1994 | Cowan et al. | |
| 5,314,022 | A | 5/1994 | Cowan et al. | |
| 5,314,852 | A | 5/1994 | Klatte | |
| 5,340,388 | A | 8/1994 | Breton et al. | |
| 5,340,860 | A | 8/1994 | Brake et al. | |
| 5,346,012 | A | 9/1994 | Heathman et al. | |
| 5,383,967 | A | 1/1995 | Chase | 106/737 |
| 5,435,846 | A | 7/1995 | Tatematsu et al. | 106/813 |
| 5,464,060 | A | 11/1995 | Hale et al. | |
| 5,494,513 | A | 2/1996 | Fu et al. | 106/672 |
| 5,501,276 | A | 3/1996 | Weaver et al. | |
| 5,527,387 | A | 6/1996 | Anderson et al. | 106/693 |
| 5,529,624 | A | 6/1996 | Riegler | 106/675 |
| 5,588,489 | A * | 12/1996 | Chatterji et al. | 166/293 |
| 5,626,665 | A | 5/1997 | Barger et al. | 106/706 |
| 5,658,624 | A | 8/1997 | Anderson et al. | 428/34.7 |
| 5,680,900 | A | 10/1997 | Nguyen et al. | |
| 5,711,383 | A * | 1/1998 | Terry et al. | 175/72 |
| 5,716,910 | A | 2/1998 | Totten et al. | 507/102 |
| 5,759,964 | A | 6/1998 | Shuchart et al. | 507/209 |
| 5,776,850 | A | 7/1998 | Klatte et al. | |
| 5,788,762 | A | 8/1998 | Barger et al. | 106/706 |
| 5,789,352 | A | 8/1998 | Carpenter et al. | 507/209 |
| 5,807,810 | A * | 9/1998 | Blezard et al. | 507/103 |
| 5,821,233 | A | 10/1998 | Van Rijn et al. | |
| 5,851,960 | A | 12/1998 | Totten et al. | 507/118 |
| 5,866,517 | A | 2/1999 | Carpenter et al. | 507/226 |
| 5,880,048 | A * | 3/1999 | Sato et al. | 501/125 |
| 5,883,070 | A | 3/1999 | Urfer et al. | |
| 5,900,052 | A | 5/1999 | Nakajima et al. | |
| 5,902,564 | A | 5/1999 | Lujano et al. | |
| 5,913,364 | A | 6/1999 | Sweatman | |
| 5,964,692 | A | 10/1999 | Blezard et al. | |
| 5,980,446 | A | 11/1999 | Loomis et al. | |
| 5,990,052 | A | 11/1999 | Harris | 507/214 |
| 5,997,625 | A | 12/1999 | Londo et al. | |
| 6,060,434 | A | 5/2000 | Sweatman et al. | |
| 6,063,738 | A | 5/2000 | Chatterji et al. | 507/269 |
| 6,070,664 | A | 6/2000 | Dalrymple et al. | 166/281 |
| 6,138,759 | A | 10/2000 | Chatterji et al. | |
| 6,145,591 | A | 11/2000 | Boncan et al. | 166/291 |
| 6,149,724 | A | 11/2000 | Ulibarri et al. | |
| 6,153,562 | A | 11/2000 | Villar et al. | |
| 6,167,967 | B1 | 1/2001 | Sweatman | |
| 6,170,575 | B1 | 1/2001 | Reddy et al. | 166/293 |
| 6,171,386 | B1 | 1/2001 | Sabins | 106/724 |
| 6,176,315 | B1 | 1/2001 | Reddy et al. | |
| 6,182,758 | B1 | 2/2001 | Vijn | |
| 6,209,646 | B1 * | 4/2001 | Reddy et al. | 166/300 |
| 6,210,476 | B1 | 4/2001 | Chatterji et al. | |
| 6,213,213 | B1 | 4/2001 | van Batenburg et al. | 166/300 |
| 6,230,804 | B1 | 5/2001 | Mueller et al. | 166/293 |
| 6,234,251 | B1 | 5/2001 | Chatterji et al. | |
| 6,235,809 | B1 | 5/2001 | Arias et al. | 523/130 |
| 6,245,142 | B1 | 6/2001 | Reddy et al. | 106/724 |
| 6,258,757 | B1 | 7/2001 | Sweatman et al. | |
| 6,283,213 | B1 | 9/2001 | Chan | 166/291 |
| 6,312,515 | B1 | 11/2001 | Barlet-Gouedard et al. | |
| 6,315,042 | B1 | 11/2001 | Griffith et al. | |
| 6,372,694 | B1 | 4/2002 | Osinga et al. | |
| 6,379,456 | B1 | 4/2002 | Heathman et al. | 106/724 |
| 6,387,873 | B1 | 5/2002 | Carter et al. | |
| 6,390,197 | B1 | 5/2002 | Maroy | |
| 6,405,801 | B1 | 6/2002 | Vijn et al. | |
| 6,409,819 | B1 | 6/2002 | Ko | 106/707 |
| 6,457,524 | B1 * | 10/2002 | Roddy | 166/293 |
| 6,475,275 | B1 | 11/2002 | Nebesnak et al. | 106/803 |
| 6,478,869 | B2 | 11/2002 | Reddy et al. | 106/724 |
| 6,488,091 | B1 | 12/2002 | Weaver et al. | 166/300 |
| 6,494,951 | B1 | 12/2002 | Reddy et al. | 106/705 |
| 6,508,305 | B1 | 1/2003 | Brannon et al. | 166/293 |
| 6,508,306 | B1 | 1/2003 | Reddy et al. | |
| 6,524,384 | B2 | 2/2003 | Griffith et al. | |
| 6,555,505 | B1 | 4/2003 | King et al. | 507/202 |
| 6,565,647 | B1 | 5/2003 | Day et al. | 106/813 |
| 6,566,310 | B2 | 5/2003 | Chan | 507/211 |
| 6,572,698 | B1 | 6/2003 | Ko | 106/772 |
| 6,593,402 | B2 | 7/2003 | Chatterji et al. | |
| 6,607,035 | B1 | 8/2003 | Reddy et al. | |
| 6,610,139 | B2 | 8/2003 | Crook et al. | 106/724 |
| 6,616,753 | B2 | 9/2003 | Reddy et al. | 106/718 |
| 6,626,243 | B1 | 9/2003 | Go Boncan | 166/293 |
| 6,626,991 | B1 | 9/2003 | Drochon et al. | |
| 6,630,021 | B2 | 10/2003 | Reddy et al. | |
| 6,645,289 | B2 * | 11/2003 | Sobolev et al. | 106/705 |
| 6,656,265 | B1 | 12/2003 | Garnier et al. | |
| 6,656,266 | B1 | 12/2003 | Barlet-Gouedard et al. | |
| 6,660,080 | B2 | 12/2003 | Reddy et al. | 106/724 |
| 6,702,044 | B2 | 3/2004 | Reddy et al. | |
| 6,711,213 | B2 | 3/2004 | He et al. | |
| 6,713,553 | B2 | 3/2004 | Gonnon et al. | |
| 6,719,055 | B2 | 4/2004 | Mese et al. | |
| 6,722,434 | B2 * | 4/2004 | Reddy et al. | 166/292 |
| 6,729,405 | B2 | 5/2004 | DiLullo et al. | |
| 6,737,385 | B2 | 5/2004 | Todd et al. | |
| 6,743,288 | B2 | 6/2004 | Eoff et al. | |
| 6,752,866 | B2 | 6/2004 | Gonnon et al. | |
| 6,767,868 | B2 * | 7/2004 | Dawson et al. | 507/236 |
| 6,786,966 | B1 | 9/2004 | Johnson et al. | |
| 6,793,018 | B2 | 9/2004 | Dawson et al. | |
| 6,793,730 | B2 | 9/2004 | Reddy et al. | |
| 6,796,378 | B2 | 9/2004 | Reddy et al. | |
| 6,822,061 | B2 | 11/2004 | Eoff et al. | |
| 6,823,940 | B2 | 11/2004 | Reddy et al. | |
| 6,832,651 | B2 | 12/2004 | Ravi et al. | |
| 6,832,652 | B1 | 12/2004 | Dillenbeck et al. | |
| 6,837,316 | B2 | 1/2005 | Reddy et al. | |
| 6,840,319 | B1 | 1/2005 | Chatterji et al. | |
| 6,840,996 | B2 | 1/2005 | Morioka et al. | |
| 6,843,841 | B2 | 1/2005 | Reddy et al. | |
| 6,881,708 | B2 | 4/2005 | Reddy et al. | |
| 6,883,609 | B2 | 4/2005 | Drochon et al. | |
| 6,887,828 | B2 | 5/2005 | Allen et al. | |
| 6,889,767 | B2 * | 5/2005 | Reddy et al. | 166/293 |
| 6,907,929 | B2 | 6/2005 | Leroy-Delage et al. | |
| 6,953,091 | B2 | 10/2005 | Volpert | |
| 6,959,773 | B2 | 11/2005 | Mese et al. | |
| 6,960,624 | B2 | 11/2005 | Gonnon et al. | |
| 6,964,302 | B2 | 11/2005 | Luke et al. | |
| 6,989,057 | B2 | 1/2006 | Getzlaf et al. | |

| | | | |
|---|---|---|---|
| 7,021,380 B2 * | 4/2006 | Caveny et al. | 166/293 |
| 7,048,053 B2 | 5/2006 | Santra et al. | |
| 7,073,585 B2 * | 7/2006 | Morgan et al. | 166/294 |
| 7,137,448 B2 | 11/2006 | Arias et al. | 466/292 |
| 7,140,439 B2 | 11/2006 | Luke et al. | |
| 7,140,440 B2 | 11/2006 | Luke et al. | |
| 7,147,067 B2 | 12/2006 | Getzlaf et al. | |
| 7,150,321 B2 | 12/2006 | Luke et al. | |
| 7,182,137 B2 | 2/2007 | Fyten et al. | |
| 7,228,905 B2 | 6/2007 | Santra et al. | |
| 7,309,558 B1 | 12/2007 | Michel et al. | |
| 2001/0014651 A1 | 8/2001 | Reddy et al. | 502/408 |
| 2002/0077390 A1 | 6/2002 | Gonnon et al. | 524/42 |
| 2002/0091177 A1 | 7/2002 | Gonnon et al. | 524/5 |
| 2002/0117090 A1 * | 8/2002 | Ku | 106/737 |
| 2002/0157575 A1 | 10/2002 | DiLullo et al. | 106/714 |
| 2003/0108113 A1 | 6/2003 | He et al. | 375/262 |
| 2003/0153466 A1 * | 8/2003 | Allen et al. | 504/358 |
| 2003/0203996 A1 | 10/2003 | Gonnon et al. | 524/5 |
| 2004/0007162 A1 | 1/2004 | Morioka et al. | 106/714 |
| 2004/0040475 A1 | 3/2004 | Roij | 106/819 |
| 2004/0083926 A1 | 5/2004 | Mitkova et al. | |
| 2004/0107877 A1 | 6/2004 | Getzlaf et al. | 106/813 |
| 2004/0108113 A1 | 6/2004 | Luke et al. | 166/292 |
| 2004/0112255 A1 | 6/2004 | Bruno et al. | |
| 2004/0112600 A1 | 6/2004 | Luke et al. | 166/295 |
| 2004/0187740 A1 | 9/2004 | Timmons | |
| 2004/0188091 A1 | 9/2004 | Luke et al. | 166/291 |
| 2004/0188092 A1 | 9/2004 | Santra et al. | 166/291 |
| 2004/0244977 A1 | 12/2004 | Luke et al. | 166/292 |
| 2004/0262000 A1 * | 12/2004 | Morgan et al. | 166/293 |
| 2004/0262001 A1 * | 12/2004 | Caveny et al. | 166/293 |
| 2005/0000734 A1 | 1/2005 | Getzlaf et al. | 175/73 |
| 2005/0034864 A1 * | 2/2005 | Caveny et al. | 166/293 |
| 2005/0121194 A1 * | 6/2005 | Morgan et al. | 166/293 |
| 2005/0124503 A1 * | 6/2005 | Morgan et al. | 507/226 |
| 2005/0133222 A1 | 6/2005 | Arias et al. | |
| 2005/0204962 A1 | 9/2005 | Luke et al. | |
| 2006/0025312 A1 | 2/2006 | Santra et al. | |
| 2006/0108150 A1 | 5/2006 | Luke et al. | |
| 2006/0148657 A1 | 7/2006 | Santra et al. | |
| 2006/0258547 A1 | 11/2006 | Luke et al. | |
| 2007/0028811 A1 | 2/2007 | Luke et al. | |
| 2007/0032388 A1 | 2/2007 | Getzlaf et al. | |
| 2007/0051279 A1 | 3/2007 | Fyten et al. | |
| 2007/0051280 A1 | 3/2007 | Fyten et al. | |
| 2007/0051515 A1 | 3/2007 | Fyten et al. | |
| 2007/0101906 A1 | 5/2007 | Luke et al. | |
| 2008/0066652 A1 | 3/2008 | Fraser et al. | |

FOREIGN PATENT DOCUMENTS

| | | | |
|---|---|---|---|
| EP | 0 802 253 A1 | 10/1997 | |
| EP | 0 895 971 A1 | 2/1999 | |
| EP | 0895971 | 2/1999 | |
| EP | 895971 A1 * | 2/1999 | |
| EP | 0621247 | 7/1999 | |
| EP | 0 1260 491 A1 | 11/2002 | |
| EP | 1 428 805 A1 | 6/2004 | |
| FR | 763.998 | 11/1934 | |
| GB | 1469954 | 4/1977 | |
| GB | 2 353 523 A | 2/2001 | |
| JP | 52117316 | 1/1977 | |
| JP | 61021947 A | 1/1986 | |
| JP | 07 003254 | 1/1995 | |
| JP | 1011487 | 4/1998 | |
| SU | 1373781 A | 2/1988 | |
| WO | WO 97/28097 | 8/1997 | |
| WO | WO 98/54108 | * 12/1998 | |
| WO | WO 00/50357 | 8/2000 | |
| WO | 01/70646 A1 | 9/2001 | |
| WO | WO 2005/059301 A1 | 6/2005 | |

OTHER PUBLICATIONS

Paper entitled "Alteration of Clay Minerals And Zeolites In Hydrothermal Brines", by Sridhar Komarneni et al., pp. 383-391, dated 1983.
Paper entitled "A Non-Conventional Way of Developing Cement Slurry For Geothermal Wells", by V. Barlet-Gouedard et al., pp. 85-91, dated 2001.
Paper entitled "Portland-Zeolite-Cement For Minimizing Alkali-Aggregate Expansion", by R. Sersale, pp. 404-410, dated 1987.
Paper entitled "Zeolite Crystallization In Portland Cement Concrete Due To Alkali-Aggregate Reaction", by S.A. Marfil et al., p. 1283-1288, dated 1993.
Paper entitled "A study on the hydration rate of natural zeoite blended cement pastes", by C.S. Poon et al., pp. 427-432, dated 1999.
Paper entitled "Zeolite ceramsite cellular concrete", by N-Q. Feng pp. 117-122, dated 2000.
Paper entitled "Immobilization of caesium-loaded ion exchange resins in Ziolite-cement blends", by Sandor Bagosi et al., pp. 479-485, dated 1999.
Paper entitled "Effect of Bentonite and Zeolite on Durability of Cement Suspension under Sulfate Attack", by Ivan Janotka, pp. 710-715, dated 1988.
Paper entitled "Reuse of waste catalysts from petrochemical industries For cement substitution", by Nan Su et al., pp. 1773-1783, dated 2000.
Paper entitled "Extreme vertices design of concrete with combined Mineral admixtures", by Jian-Tong Ding et al., pp. 957-960, dated 1999.
Paper entitled "The Properties of Mortar Using Blends With Portland Cement Clinker, Zeolite Tuff and Gypsum", by Ivan Janotka, et al., pp. 105-110, dated 1995.
Paper entitled "Study on the suppression effect of natural zeolite on Expansion of concrete due to alkali-aggregate reaction", by Feng Naiqian et al., pp. 17-24, dated 1998.
Paper entitled "Comparative study of the initial surface absorption and Chloride diffusion of high performance zeolite, silica fume and PFA Concrete", by Sammy Y.N. Chan et al., pp. 293-300, dated 1999.
Paper entitled "A study on the hydration rate of natural zeolite Blended cement pastes", by C.S. Poon et al., pp. 427-432, dated 1999.
Paper entitled "Zeolite P In Cements: Its Potential For Immobilizing Toxic And Radioactive Waste Species,"by M. Atkins, et al., dated 1994.
Powder Diffraction File, PFD, Alphabetical Indexes for Experimental Patterns, Inorganic Phases, Sets 1-52, dated 2002.
Foreign communication from a related counterpart application dated Mar. 25, 2004.
Office action from a related counterpart application dated Dec. 4, 2003.
International Center for Materials Technology Promotion, "Special Cements and Their Production Technology: CSA Series, Hydraulic Cement Series, Oil Well Cement Series etc: Hydraulic Engineering Cemet", (2003).
Portland Cement Association, "Portland Cement, Concrete, and Heat of hydration", Concrete Technology Today, (1997), pp. 1-4, vol. 18, No. 2, Construction Information Services Department of the Portland Cement Association.
Foreign communication from a related counterpart application dated Nov. 25, 2004.
Office action from a related counterpart application dated Jun. 25, 2004.
Office action from a related cuonterpart application dated Sep. 10, 2004.
Office action from a related counterpart application dated Nov. 9, 2004.
Foreign communication from a related counterpart application dated Aug. 23, 2004.
Foreign communication from a related counterpart application dated Jul. 28, 2005.
Office Action dated Dec. 27, 2005, from a related counterpart U.S. Appl. No. 10/816,034, filed Apr. 1, 2004.

Foreign Communication from a related counterpart application dated Nov. 4, 2005.
Office action from a related counterpart application dated Nov. 4, 2005, U.S. Appl. No. 10/727,370.
Office action from a related counterpart application dated Nov. 7, 2005, U.S. Appl. No. 10/738,1999.
Office action from a related counterpart application (U.S. Appl. No. 10/795,158) dated Dec. 6, 2005.
Office Action from a related counterpart application, U.S. Appl. No. 11/126,626 dated Jun. 23, 2006.
Office action from a related counterpart application (U.S. Appl. No. 11/126,626) dated Dec. 7, 2005.
Office Action from a related counterpart application, U.S. Appl. No. 11/126,626 dated Dec. 7, 2005.
Office Action dated May 12, 2005, issued in connection with U.S. Appl. No. 10/315,415.
Office Action dated Nov. 18, 2004, issued in connection with U.S. Appl. No. 10/686,098.
Office Action dated Jan. 22, 2007, issued in connection with U.S. Appl. No. 11/338,576.
Office Action dated Jun. 21, 2007, issued in connection with U.S. Appl. No. 11/338,576.
Halliburton brochure entitled HR-5 Cement Additive, 1998.
Halliburton brochure entitled SSA-1 Strength Stabilizing Agent, 1998.
Halliburton brochure entitled CFR-3 Cement Friction Reducer, 1998.
Halliburton brochure entitled Halad-344 Fluid-Loss Additive, 1998.
Halliburton brochure entitled Halad-413 Fluid-Loss Additive, 1998.
Halliburton brochure entitled MICROSAND Cement Additive, 1999.
Halliburton brochure entitled SSA-2 Coarse Silica Flour, 1999.
Halliburton brochure entitled CFR-2 Cement Friction Reducer, 1999.
Halliburton borchure entitled D-Air 2 Anti-Foam Agent, 1999.
Halliburton/Baroid brochure AQUAGEL GOLD SEAL, 2002.
Halliburton/Baroid brochure entitled EZ MUL Emulsifier, 2002.
Halliburton/Baroid brochure entitled EZ MUL NTE Emulsifier, 2002.
Halliburton/Baroid brochure entitled GELTONE II Viscosifier, 2002.
Halliburton/Baroid brochure entitled GELTONE V Viscosifier, 2002.
Halliburton/Baroid brochure entitled DURATONE HT, Filtration Control Agent, 2002.
Halliburton/Baroid brochure entitled BARAZAN PLUS, 2002.
Halliburton/Baroid brochure entitled EZ-MUD Shale Stabilizer, 2002.
Halliburton/Baroid brochure entitled INVERMUL Emulsifier, 2002.
Halliburton/Baroid brochure entitled BARAZAN Viscosifier/Suspension Agent, 2005.
Halliburton/Baroid brochure entitled DURATONE HT, Filtration Control Agent, 2005.
Halliburton/Baroid brochure entitled EZ-MUD Shale Stabilizer, 2005.
Halliburton/Baroid brochure entitled EZ MUL Emulsifier, 2005.
Halliburton/Baroid brochure entitled EZ MUL NTE Emulsifier, 2005.
Halliburton/Baroid brochure entitled GELTONE II Viscosifier, 2005.
Halliburton/Baroid brochure entitled GELTONE V Viscosifier, 2005.
Halliburton/Baroid brochure entitled INVERMUL Emulsifier, 2005.
Notice of Allowance issued Dec. 14, 2007, by the U.S. Patent and Trademark Office in connection with U.S. Appl. No. 11/338,576.
Office Action issued Nov. 7, 2007, by the United States Patent and Trademark Office in connection with U.S. Appl. No. 11/270,307.
Office Action issued Oct. 9, 2007, by the United States Patent and Trademark Office in connection with U.S. Appl. No. 11/488,388.
Office Action issued Oct. 30, 2007, by the United States Patent and Trademark Office in connection with U.S. Appl. No. 11/544,691.
Office Action issued Apr. 16, 2008, by the U.S. Patent and Trademark Office in connection with U.S. Appl. No. 11/488,388.
Derwent Abstract of WO 2000/42147 entitled "Detergent Composition Useful in Cleaning Fabric, Dishware and or Hard Surfaces . . . "; Bettiol et al. as inventors, Jul. 20, 2000.
Office Action mailed May 27, 2008, by the U.S. Patent and Trademark Office in connection with U.S. Appl. No. 11/544,691.
Advisory Action mailed Jan. 12, 2009, by the U.S. Patent and Trademark Office in connection with U.S. Appl. No. 11/488,388.
Advisory Action mailed Aug. 11, 2008, by the U.S. Patent and Trademark Office in connection with U.S. Appl. No. 11/544, 691.
Office Action mailed Oct. 27, 2008, by the U.S. Patent and Trademark Office in connection with U.S. Appl. No. 11/488,388.
Office Action mailed Nov. 13, 2008, by the U.S. Patent and Trademark Office in connection with U.S. Appl. No. 11/544,691.
Office action from U.S. Appl. No. 11/388,485 dated Aug. 11, 2006.
Luke, Karen et al., "Zeolite-Containing Drilling Fluids," filed Oct. 9, 2006 as U.S. Appl. No. 11/544,691.
Luke, Karen et al., "Fluid Loss Additives For Cement Slurries," filed Oct. 10, 2006 as U.S. Appl. No. 11/545,392.
Office Action from a related counterpart U.S. Appl. No. 11/126,626 dated Dec. 7, 2005.
Office action from a related counterpart U.S. Appl. No. 10/795,158 dated Dec. 6, 2005.
Office action dated Nov. 24, 2006 from U.S. Appl. No. 11/126,626.
Fyten, Glen et al., "Cementitious Compositions Containing Interground Cement Clinker and Zeolite" filed Nov. 8, 2006 as U.S. Appl. No. 11/594,435.
Fyten, Glen et al., "Cementitious Compositions Containing Interground Cement Clinker and Zeolite" filed Nov. 8, 2006 as U.S. Appl. No. 11/591,326.
Fyten, Glen et al., "Cementitious Compositions Containing Interground Cement Clinker and Zeolite" filed Nov. 8, 2006 as U.S. Appl. No. 11/594,430.

* cited by examiner

ZEOLITE-CONTAINING TREATING FLUID

CROSS-REFERENCE TO RELATED APPLICATIONS

This application is a continuation-in-part of prior application Ser. No. 10/315,415, filed Dec. 10, 2002, now U.S. Pat. No. 6,989,057, the entire disclosure of which is incorporated herein by reference.

BACKGROUND

The present embodiment relates generally to a treating fluid, particularly a spacer fluid for introduction into a subterranean zone penetrated by a wellbore.

A spacer fluid is a fluid used to displace one "performance" fluid in a wellbore before the introduction into the wellbore of another performance fluid. For example, while drilling oil and gas wells, one performance fluid, such as an oil-based or water-based drilling fluid, is circulated through the string of drill pipe, through the drill bit and upwardly to the earth surface through the annulus formed between the drill pipe and the surface of the wellbore. The drilling fluid cools the drill bit, lubricates the drill string and removes cuttings from the wellbore. During the drilling process, the drilling fluid dehydrates or loses filtrate to the formation so that the fluid remaining in the annulus gels or increases in viscosity and a layer of solids and gelled drilling fluid known as filter cake is deposited against the formation face.

When the desired drilling depth of the well is reached, another performance fluid, such as a slurry containing a cement composition, is pumped into the annular space between the walls of the wellbore and pipe string or casing. In this process, known as "primary cementing," the cement composition sets in the annulus, supporting and positioning the casing, and forming a substantially impermeable barrier, or cement sheath, which isolates the casing from subterranean zones. It is understood that the bond between the set cement composition and the wellbore is crucial to zonal isolation.

However, the increase in viscosity of the drilling fluid and deposit of filter cake are detrimental to obtaining effective drilling fluid displacement and removal from the walls of the wellbore and a subsequent competent bond between casing, primary cement and the walls of the wellbore. Incomplete displacement of the drilling fluid often prevents the formation of an adequate bond between the cement, the casing or pipe and the wellbore.

In addition, when pumping various fluids into a wellbore, it is important to make sure that they do not adversely affect the properties of other fluids in the wellbore. It is understood that such fluids having adverse reactions with each other are referred to as being "incompatible."

Spacer fluids are often used in oil and gas wells to facilitate improved displacement efficiency when pumping new fluids into the wellbore. Spacer fluids are typically placed between one or more fluids contained within or to be pumped within the wellbore. Spacer fluids are also used to enhance solids removal during drilling operations, to enhance displacement efficiency and to physically separate chemically incompatible fluids. For instance, in primary cementing, the cement slurry is separated from the drilling fluid and partially dehydrated gelled drilling fluid is removed from the walls of the wellbore by a spacer fluid pumped between the drilling fluid and the cement slurry. Spacer fluids may also be placed between different drilling fluids during drilling fluid change outs or between a drilling fluid and a completion brine.

While the preferred embodiments described herein relate to spacer fluids and cement compositions, it is understood that any treating fluids such as drilling, completion and stimulation fluids including, but not limited to, drilling muds, well cleanup fluids, workover fluids, conformance fluids, gravel pack fluids, acidizing fluids, fracturing fluids and the like can be prepared using zeolite and a carrier fluid. Accordingly, improved methods of the present invention comprise the steps of preparing a wellbore treating fluid using a carrier fluid and zeolite, as previously described herein, and placing the fluid in a subterranean formation.

Therefore, treating fluids that have beneficial rheological properties and are compatible with a variety of fluids are desirable.

DESCRIPTION

Treating fluids, preferably spacer fluids and cement compositions, as well as drilling, completion and stimulation fluids including, but not limited to, drilling muds, well cleanup fluids, workover fluids, conformance fluids, gravel pack fluids, acidizing fluids, fracturing fluids and the like, for introduction into a subterranean zone penetrated by a wellbore according to the present embodiment comprise zeolite and a carrier fluid. Preferably, the wellbore treating fluids also include one or more of a viscosifier, an organic polymer, dispersants, surfactants and weighting materials. Examples of wellbore treating fluids are taught in U.S. Pat. Nos. 4,444,668; 4,536,297; 5,716,910; 5,759,964; 5,990,052; 6,070,664; 6,213,213; 6,488,091 and 6,555,505, each of which is incorporated herein by reference.

A preferred fluid for use in the present embodiment includes cementing compositions as disclosed in U.S. patent application Ser. No. 10/315,415 filed Dec. 10, 2002, the entire disclosure of which is hereby incorporated herein by reference.

Preferably, the wellbore treating fluid is prepared as a dry mix including the zeolite and optionally the viscosifier, organic polymer and dispersants. Prior to use as a wellbore treating fluid, varying ratios of dry mix, weighting material, carrier fluid and optionally surfactants are combined to yield the desired wellbore treating fluid density and viscosity.

Zeolites are porous alumino-silicate minerals that may be either a natural or manmade material. Manmade zeolites are based on the same type of structural cell as natural zeolites and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

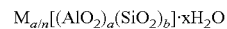

$$M_{a/n}[(AlO_2)_a(SiO_2)_b]\cdot xH_2O$$

where M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range from greater than or equal to 1 and less than or equal to 5; and x represents the moles of water entrained into the zeolite framework.

Preferred zeolites for use in the wellbore treating fluid of the present embodiment include analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), stilbite (hydrated sodium calcium aluminum silicate) and thomsonite (hydrated sodium calcium aluminum silicate). Most preferably, the zeolites for use in the spacer fluids of the present embodiment include chabazite and clinoptilolite.

In a preferred embodiment of the invention, the wellbore treating fluid dry mix includes from about 5 to 90% by weight of zeolites, and more preferably from about 60 to 70% by weight of zeolites.

As used herein the term "viscosifier" means any agent that increases the viscosity of a fluid, and preferably produces a low density wellbore treating fluid preferably a spacer fluid which is compatible with drilling fluids, cement slurries and completion fluids. Agents which are useful as viscosifiers include, but are not limited to, colloidal agents, such as clays, polymers, guar gum; emulsion forming agents; diatomaceous earth; and starches. Suitable clays include kaolinites, montmorillonite, bentonite, hydrous micas, attapulgite, sepiolite, and the like and also synthetic clays, such as laponite. The choice of a viscosifier depends upon the viscosity desired, chemical capability with the other fluids, and ease of filtration to remove solids from the low density wellbore treating fluid. Preferably, the viscosifier is easily flocculated and filterable out of the wellbore treating fluid.

Preferably, the viscosifier is a clay and is preferably selected from the group consisting of sepiolite and attapulgite. Most preferably, the clay is sepiolite.

In a preferred embodiment, the wellbore treating fluid dry mix includes from about 5 to 80% by weight of the viscosifier, and more preferably from about 20 to 30% by weight of the viscosifier.

The wellbore treating fluids of the present embodiment preferably include a polymeric material for use as a viscosifier or fluid loss control agent. Polymers which are suitable for use as a viscosifier or fluid loss control agent in accordance with the present embodiment include polymers which contain, in sufficient concentration and reactive position, one or more hydroxyl, cis-hydroxyl, carboxyl, sulfate, sulfonate, amino or amide functional groups. Particularly suitable polymers include polysaccharides and derivatives thereof which contain one or more of the following monosaccharide units: galactose, mannose, glucoside, glucose, xylose, arabinose, fructose, glucuronic acid or pyranosyl sulfate. Natural polymers containing the foregoing functional groups and units include guar gum and derivatives thereof, locust bean gum, tara, konjak, starch, cellulose, karaya gum, xanthan gum, tragacanth gum, arabic gum, ghatti gum, tamarind gum, carrageenan and derivatives thereof. Modified gums such as carboxyalkyl derivatives, like carboxymethyl guar, and hydroxyalkyl derivatives, like hydroxypropyl guar can also be used. Doubly derivatized gums such as carboxymethylhydroxypropyl guar (CMHPG) can also be used.

Synthetic polymers and copolymers which contain the above-mentioned functional groups and which can be utilized as a viscosifier or fluid loss control agent include, but are not limited to, polyacrylate, polymethacrylate, polyacrylamide, maleic anhydride, methylvinyl ether copolymers, polyvinyl alcohol and polyvinylpyrrolidone.

Modified celluloses and derivatives thereof, for example, cellulose ethers, esters and the like can also be used as the viscosifier or fluid loss control agent of the spacer fluids of the present embodiment. In general, any of the water-soluble cellulose ethers can be used. Those cellulose ethers include, among others, the various carboxyalkylcellulose ethers, such as carboxyethylcellulose and carboxymethylcellulose (CMC); mixed ethers such as carboxyalkylethers, e.g., carboxymethylhydroxyethylcellulose (CMHEC); hydroxyalkylcelluloses such as hydroxyethylcellulose (HEC) and hydroxypropylcellulose; alkylhydroxyalkylcelluloses such as methylhydroxypropylcellulose; alkylcelluloses such as methylcellulose, ethylcellulose and propylcellulose; alkylcarboxyalkylcelluloses such as ethylcarboxymethylcellulose; alkylalkylcelluloses such as methylethylcellulose; hydroxyalkylalkylcelluloses such as hydroxypropylmethylcellulose; and the like.

Preferred polymers include those selected from the group consisting of welan gum, xanthan gum, galactomannan gums, succinoglycan gums, scleroglucan gums, and cellulose and its derivatives, particularly hydroxyethylcellulose. In a preferred embodiment, the wellbore treating fluid dry mix includes from about 0 to 6% by weight of the polymers, and more preferably from about 1 to 3% by weight of the polymers.

The wellbore treating fluids of the present embodiment preferably include a dispersant. Preferred dispersants include those selected from the group consisting of sulfonated styrene maleic anhydride copolymer, sulfonated vinyltoluene maleic anhydride copolymer, sodium naphthalene sulfonate condensed with formaldehyde, sulfonated acetone condensed with formaldehyde, lignosulfonates and interpolymers of acrylic acid, allyloxybenzene sulfonate, allyl sulfonate and non-ionic monomers. In a preferred embodiment, the wellbore treating fluid dry mix includes from about 1 to 18% by weight of the dispersant, and more preferably from about 9 to 11% by weight of the dispersant.

Preferably, the carrier fluid is an aqueous fluid, such as water, hydrocarbon-based liquids, emulsion, acids, or mixtures thereof. The preferred carrier fluid depends upon the type of drilling fluid utilized in drilling the wellbore, cost, availability, temperature stability, viscosity, clarity, and the like. Based on cost and availability, water is preferred.

Preferably, the water incorporated in the wellbore treating fluids of the present embodiment, can be fresh water, unsaturated salt solution, including brines and seawater, and saturated salt solution. Generally, any type of water can be used, provided that it does not contain an excess of compounds, well known to those skilled in the art, that adversely affect properties of hydration.

In a preferred embodiment of the invention, the carrier fluid is present in the wellbore treating fluid at a rate of from about 45 to 95% by volume of the prepared wellbore treating fluid, and more preferably from about 65 to 75% by volume of the prepared wellbore treating fluid.

The wellbore treating fluids of the present embodiment preferably include a weighting material. Preferred weighting materials include those selected from the group consisting of barium sulfate, also known as "barite", hematite, manganese tetraoxide, ilmenite and calcium carbonate. In a preferred embodiment of the invention, the weighting material is present in the spacer fluid at a rate of from about 4 to 85% by volume of the prepared wellbore treating fluid, and more preferably from about 15 to 75% by volume of the prepared wellbore treating fluid.

When the wellbore treating fluids of the present embodiment are intended for use in the presence of oil-based drilling fluids or synthetic-based drilling fluids, the wellbore treating fluids preferably include a surfactant.

According to this embodiment, preferred surfactants include nonylphenol ethoxylates, alcohol ethoxylates, sugar lipids, α-olefinsulfonates, alkylpolyglycosides, alcohol sulfates, salts of ethoxylated alcohol sulfates, alkyl amidopropyl dimethylamine oxides and alkene amidopropyl dimethylamine oxides such as those disclosed in U.S. Pat. Nos. 5,851,960 and 6,063,738, the entire disclosures of which are hereby incorporated herein by reference. Especially preferred surfactants include nonylphenol ethoxylates, alcohol ethoxylates and sugar lipids.

A suitable surfactant which is commercially available from Halliburton Energy Services of Duncan, Okla. under the trade name "AQF-2™" is a sodium salt of α-olefinic sulfonic acid (AOS) which is a mixture of compounds of the formulas:

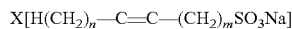

and

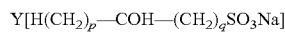

wherein:
  n and m are individually integers in the range of from about 6 to about 16;
  p and q are individually integers in the range of from about 7 to about 17; and
  X and Y are fractions with the sum of X and Y being 1.

Another suitable surfactant which is commercially available from Halliburton Energy Services of Duncan, Okla., under the trade designation "CFA-S™" has the formula:

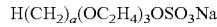

wherein:
  a is an integer in the range of from about 6 to about 10.

Another suitable surfactant is comprised of an oxyalkylatedsulfonate, which is commercially available from Halliburton Energy Services, Duncan, Okla. under the trade designation "FDP-C485."

Still another suitable surfactant which is commercially available from Halliburton Energy Services under the trade designation "HOWCO-SUDS™" is an alcohol ether sulfate of the formula:

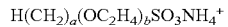

wherein:
  a is an integer in the range of from about 6 to about 10; and
  b is an integer in the range of from about 3 to about 10.

Another suitable surfactant is comprised of alkylpolysaccharides and is commercially available from Seppic, Inc. of Fairfield, N.J. under the trade designation "SIMUSOL-10."

Another suitable surfactant is cocoamine betaine and is commercially available under the tradename "HC-2" from Halliburton Energy Services of Duncan, Okla.

Another suitable surfactant is an ethoxylated alcohol ether sulfate having the formula:

wherein a is an integer in the range of from about 6 to about 10 and b is an integer in the range of from about 3 to about 10.

Still another suitable surfactant is an alkyl or alkene amidopropyl betaine surfactant having the formula:

wherein R is a radical selected from the group of decyl, cocoyl, lauryl, cetyl and oleyl.

Still another suitable surfactant is an alkyl or alkene amidopropyl dimethyl amine oxide surfactant having the formula:

wherein R is a radical selected from the group of decyl, cocoyl, lauryl, cetyl and oleyl.

In a preferred embodiment of the invention, the surfactant is present in the wellbore treating fluid at a rate of from about 0 to 20% by volume of the prepared wellbore treating fluid, and more preferably from about 2 to 6% by volume of the prepared wellbore treating fluid.

Spacer fluids are characterized by favorable 300/3 ratios. A 300/3 ratio is defined as the 300 rpm shear stress divided by the 3 rpm shear stress measured on a Chandler or Fann Model 35 rotational viscometer using a B1 bob, an R1 sleeve and a No. 1 spring. An ideal spacer fluid would have a flat rheology, i.e., a 300/3 ratio approaching 1. Moreover, an ideal spacer fluid would exhibit the same resistance to flow across a broad range of shear rates and limit thermal thinning, particularly at low shear rates.

When the wellbore treating fluids of the present embodiment are utilized as spacer fluids, the spacer fluids achieve 300/3 ratios of 2 to 6. As a result, the compositions are well suited for drilling fluid displacement. As shown in the following examples, the spacer fluids of the present embodiment have a relatively flat rheology and are pseudo-plastic with a near constant shear stress profile.

In one embodiment, the zeolite-containing wellbore treating fluid may be prepared as a dry mix including some or all of the above-identified components, except for the carrier fluid.

In carrying out the methods of the present embodiment, a wellbore is treated by introducing into the wellbore a treating fluid comprising zeolite and a carrier fluid. Also, in carrying out the methods of the present embodiment, a first fluid is displaced with an incompatible second fluid in a wellbore utilizing a wellbore treating fluid of the present embodiment to separate the first fluid from the second fluid and to remove the first fluid from the wellbore. In primary cementing applications, the wellbore treating fluid may be utilized as a spacer fluid and is generally introduced into the casing or other pipe to be cemented between drilling fluid in the casing and a cement slurry. The cement slurry is pumped down the casing whereby the spacer fluid ahead of the cement slurry displaces drilling fluid from the interior of the casing and from the annulus between the exterior of the casing and the walls of the wellbore. The spacer fluid prevents the cement slurry from contacting the drilling fluid and thereby prevents severe viscosification or flocculation which can completely plug the casing or the annulus. As the spacer fluid is pumped through the annulus, it aggressively removes partially dehydrated/gelled drilling fluid and filter cake solids from the wellbore and maintains the removed materials in suspension whereby they are removed from the annulus.

The following examples are illustrative of the methods and compositions discussed above.

EXAMPLE 1

Eight spacer fluids ("Fluids") were prepared by combining the components as set forth in TABLE 1 below. Specifically, the dry mix materials, namely the zeolite, fumed silica, silica flour or coarse silica, the sepiolite, hydrous magnesium silicate, diatomaceous earth, dispersants, Biozan, and HEC were combined in a one liter glass jar and mixed by hand. This dry mix was then added to the mixing water in a Waring blender at 4,000 RPM in less than 10 seconds. The weighting material (barium sulfate) was then added to the Waring blender at 4,000 RPM in less than 10 seconds. The blender speed was then increased to 12,000 RPM and allowed to mix for 35 seconds. The dry mix components of the spacer fluids were added at the indicated rate on the basis of percent by weight of the dry mix and the water and barium sulfate were added at the indicated rate on the basis of percent by volume of spacer fluid composition to achieve the indicated density.

Fluids 1-3 are zeolite-containing spacer fluids according to the present embodiment. Chabazite, which is commercially available from C2C Zeolite Corporation of Calgary, Canada was used as the zeolite for fluids 1-3. Sepiolite is commercially available from Baroid Corporation of Houston, Tex. Hydroxyethylcellulose "HEC" is commercially available from Dow/Union Carbide of Midland, Mich. Welan gum, a high molecular weight biopolymer, is commercially available from the Kelco Oil Field Group of Houston, Tex., under the trademark "BIOZAN." The dispersant is commercially available from National Starch & Chemical Company of Newark, N.J. under the trade name "Alcosperse 602 ND" and is a mixture of 6 parts sulfonated styrene maleic anhydride copolymer to 3.75 parts interpolymer of acrylic acid.

Fluids 4-6 are conventional fumed silica-containing spacer fluids. Fumed silica is commercially available from Elken of Baltimore, Md.

Fluid 7 is a conventional silica flour-containing spacer fluid. Silica flour is commercially available from Unimin Corporation of New Canaan, Conn. Hydrous magnesium silicate is commercially available from Baroid Corporation of Houston, Tex.

Fluid 8 is a conventional coarse silica-containing spacer fluid. Coarse Silica was obtained from Unimin Corporation of New Canaan, Conn. Diatomaceous Earth is a commodity material commercially available from many sources.

TABLE 1

| Components | Fluid 1 | Fluid 2 | Fluid 3 | Fluid 4 | Fluid 5 | Fluid 6 | Fluid 7 | Fluid 8 |
|---|---|---|---|---|---|---|---|---|
| Zeolite | 66.0 | 66.0 | 66.0 | — | — | — | — | — |
| Fumed Silica | — | — | — | 66.0 | 66.0 | 66.0 | — | — |
| Silica Flour | — | — | — | — | — | — | 94.54 | — |
| Coarse Silica | — | — | — | — | — | — | — | 35.3 |
| Sepiolite | 22.25 | 22.25 | 22.25 | 22.25 | 22.25 | 22.25 | — | 11.8 |
| Hydrous Magnesium Silicate | — | — | — | — | — | — | 3.4 | 2.0 |
| Diatomaceous Earth | — | — | — | — | — | — | — | 41.1 |
| HEC | 0.5 | 0.5 | 0.5 | 0.5 | 0.5 | 0.5 | — | — |
| BIOZAN ® | 1.5 | 1.5 | 1.5 | 1.5 | 1.5 | 1.5 | — | — |
| Dispersant | 9.75 | 9.75 | 9.75 | 9.75 | 9.75 | 9.75 | 1.3 | 9.8 |
| *Barium Sulfate | 4.75 | 16.18 | 27.71 | 4.75 | 16.18 | 27.71 | 18.19 | 26.85 |
| *Water | 90.8 | 80.0 | 69.3 | 90.8 | 80.0 | 69.3 | 60.7 | 68.6 |
| Density lb/gal | 10.0 | 13.0 | 16.0 | 10.0 | 13.0 | 16.0 | 16.0 | 16.0 |

*volume %

Fluids 1 and 4, 2 and 5, and 3 and 6-8 listed in TABLE 1 were designed to have densities of 10.0 lb/gal, 13.0 lb/gal, and 16.0 lb/gal, respectively.

EXAMPLE 2

Using a Fann Model 35 viscometer, the viscosity (in centipoise) of the zeolite-containing spacer fluids (Fluids 1, 2, and 3) and fumed silica-containing spacer fluids (Fluids 4, 5, and 6) from EXAMPLE 1 were measured at the indicated temperature, and the Fann Model 35 viscometer dial readings at the associated revolutions per minute listed in TABLE 2.

TABLE 2

Rheology Tests

| Comp. Tested | Temp. °F. | \multicolumn{8}{c}{Measurement at rpm indicated, cp.} | Yield Point lb/100 ft² | 300/3 Ratio |
|---|---|---|---|---|---|---|---|---|---|---|---|
| | | 600 | 300 | 200 | 100 | 60 | 30 | 6 | 3 | | |
| 1 | 80  | 43  | 30  | 25  | 19 | 15 | 12   | 7  | 6   | 11.9 | 5 |
|   | 130 | 35  | 26  | 21  | 16 | 13 | 11   | 7  | 5   | 10.5 | 5.2 |
|   | 190 | 31  | 23  | 20  | 16 | 14 | 12   | 9  | 8   | 12.2 | 2.9 |
| 4 | 80  | 40  | 27  | 23  | 19 | 16 | 14   | 9  | 7   | 14.2 | 3.9 |
|   | 130 | 32  | 24  | 21  | 18 | 15 | 12.5 | 9  | 8   | 13.4 | 3.0 |
|   | 190 | 29  | 21  | 18  | 15 | 13 | 12   | 9  | 7.5 | 11.9 | 2.8 |
| 2 | 80  | 102 | 72  | 59  | 43 | 35 | 28   | 17 | 15  | 26.8 | 4.8 |
|   | 130 | 77  | 55  | 46  | 36 | 30 | 25   | 16 | 14  | 24.9 | 3.9 |
|   | 190 | 55  | 40  | 33  | 25 | 21 | 17   | 11 | 10  | 16.7 | 4.0 |
| 5 | 80  | 89  | 63  | 51  | 37 | 30 | 23   | 14 | 12  | 22.2 | 5.25 |
|   | 130 | 63  | 46  | 38  | 29 | 24 | 19   | 12 | 11  | 19   | 4.2 |
|   | 190 | 45  | 34  | 27  | 20 | 18 | 15   | 10 | 8   | 14.1 | 4.25 |
| 3 | 80  | 172 | 123 | 101 | 75 | 62 | 50   | 36 | 31  | 48.5 | 4.0 |
|   | 130 | 127 | 92  | 77  | 58 | 49 | 41   | 28 | 26  | 40   | 3.5 |
|   | 190 | 105 | 76  | 65  | 51 | 45 | 37   | 27 | 23  | 37.8 | 3.3 |
| 6 | 80  | 177 | 127 | 105 | 79 | 65 | 52   | 37 | 34  | 51.2 | 3.7 |
|   | 130 | 114 | 82  | 69  | 53 | 46 | 39   | 28 | 25  | 38.4 | 3.3 |
|   | 190 | 95  | 69  | 57  | 44 | 37 | 31   | 22 | 20  | 30.4 | 3.45 |

TABLE 2 shows that the zeolite-containing spacer fluids (Fluids 1, 2, and 3) compare favorably with the fumed silica-containing spacer fluids (Fluids 4, 5, and 6), in that they have relatively high viscosities and relatively low 300/3 ratios. Also, the yield points of the zeolite-spacers containing spaces are comparable to the yield points of the silica-containing spacers. The yield point is a design parameter that determines the ratio of dry mix components to weighting materials to water.

EXAMPLE 3

Using a W. R. Grace Roto-tester, the pack set of the zeolite-containing spacer fluids (Fluids 1, 2, and 3) and fumed silica-containing spacer fluids (Fluids 4, 5, and 6) from EXAMPLE 1 were measured.

The Zeolite-containing spacer fluids (Fluids 1, 2, and 3) from EXAMPLE 1 had a pack set index of 21/22.

Fumed silica-containing spacer fluids (Fluids 4, 5, and 6) from EXAMPLE 1 had a pack set index of 29/33.

The lower pack set index numbers of the zeolite-containing spacer fluids indicate that the zeolite-containing material will flow more easily and will not pack as severely as the fumed silica-containing spacer fluids.

EXAMPLE 4

Using a 250 mL. graduated cylinder oriented in a vertical position, the percent settling of the zeolite-containing spacer fluids (Fluids 1, 2, and 3) and fumed silica-containing spacer fluids (Fluids 4, 5, and 6) from EXAMPLE 1 were measured. The spacer fluids were prepared according to Section 5, API Recommended Practice 10B, $22^{nd}$ Edition, December 1997. The results are shown in TABLE 3 below in terms of mL of free fluid in 250 mL.

TABLE 3

| Days | Fluid 1 | Fluid 4 | Fluid 2 | Fluid 5 | Fluid 3 | Fluid 6 |
|---|---|---|---|---|---|---|
| 2 | 1.6 | 3.2 | 2.1 | 2.1 | 1.1 | 3.2 |
| 3 | 2.1 | 4.2 | 2.6 | 3.2 | 1.6 | 4.2 |
| 4 | 2.1 | 4.7 | 3.2 | 4.7 | 2.1 | 5.3 |
| 5 | 2.1 | 5.3 | 3.7 | 4.7 | 2.6 | 6.3 |

The lower amount of free fluid in the spacer fluids prepared with zeolite (Fluids 1, 2, and 3) indicate better solids suspension than the spacer fluids prepared with fumed silica (Fluids 4, 5, and 6).

EXAMPLE 5

Using a FANN 35 viscometer, the viscosity of one of the zeolite-containing spacer fluids (Fluid 3), one of the fumed silica-containing spacer fluids (Fluid 6), the silica flour-containing spacer fluid (Fluid 7), and the coarse silica-containing spacer fluid (Fluid 8), from EXAMPLE 1 were measured at three temperatures, and the FANN dial reading at 300 rpm was divided by the FANN dial reading at 3 rpm to give the 300/3 ratios listed in TABLE 4.

TABLE 4

| Rheology | Fluid 3 | Fluid 6 | Fluid 7 | Fluid 8 |
|---|---|---|---|---|
| 300/3 ratio at 80° F. | 4.0 | 3.7 | 11.0 | 9.0 |
| 300/3 ratio at 135° F. | 3.5 | 3.3 | 7.8 | 5.8 |
| 300/3 ratio at 190° F. | 3.3 | 3.4 | 5.3 | 5.6 |

The consistent 300/3 ratios exhibited by the zeolite-containing spacer fluid over a wide temperature range indicates its superiority over standard silica-containing spacer fluids.

While the preferred embodiments described herein relate to spacer fluids and cement compositions, it is understood that any wellbore treating fluids such as drilling, completion and stimulation fluids including, but not limited to, drilling muds, well cleanup fluids, workover fluids, conformance fluids, gravel pack fluids, acidizing fluids, fracturing fluids and the like can be prepared using zeolite and a carrier fluid. Accordingly, improved methods of the present invention comprise the steps of preparing a wellbore treating fluid using a carrier fluid and zeolite, as previously described herein, and placing the fluid in a subterranean formation.

Preferred methods of treating a well comprise the steps of providing a wellbore treating fluid comprising a carrier fluid and zeolite, and placing the wellbore treating fluid in a subterranean formation. Additional steps can include drilling, completing and/or stimulating a subterranean formation using the wellbore treating fluid and producing a fluid, e.g., a hydrocarbon fluid such as oil or gas, from the subterranean formation.

Other embodiments of the current invention will be apparent to those skilled in the art from a consideration of this specification or practice of the invention disclosed herein. However, the foregoing specification is considered merely exemplary of the current invention with the true scope and spirit of the invention being indicated by the following claims.

The invention claimed is:

1. A composition for forming a wellbore spacer fluid comprising:
   a zeolite present from about 60 to 70% by weight of the composition, the zeolite being represented by the formula:

$M_{a/n}[(AlO_2)_a(SiO_2)_b] \cdot xH_2O$ where
   M represents one or more cations selected from the group consisting of Na, K, Mg, Ca, Sr, Li, Ba, NH$_4$, CH$_3$NH$_3$, (CH$_3$)$_3$NH, (CH$_3$)$_4$N, Ga, Ge and P;
   n represents the cation valence;
   the ratio of b:a is in a range of from greater than or equal to 1 to less than or equal to 5; and
   x represents the number of moles of water entrained into the zeolite framework;
   a clay present from about 20 to 30% by weight of the composition selected from the group consisting of kaolinites, montmorillonite, bentonite, hydrous micas, attapulgite, sepiolite, and laponite; and
   a polymeric material present from about 1 to 3% by weight of the composition selected from the group consisting of hydroxyethylcellulose, cellulose, carboxyethylcellulose, carboxymethylcellulose, carboxymethylhydroxyethylcellulose, hydroxypropylcellulose, methylhydroxypropylcellulose, methylcellulose, ethylcellulose, propylcellulose, ethylcarboxymethylcellulose, methylethylcellulose, hydroxypropylmethylcellulose, starch, guar gum, locust bean gum, tara, konjak, karaya gum, welan gum, xanthan gum, galactomannan gums, succinoglycan gums, scleroglucan gums, tragacanth gum, arabic gum, ghatti gum, tamarind gum, carrageenan, carboxymethyl guar, hydroxypropyl guar, carboxymethylhydroxypropyl guar, polyacrylate, polymethacrylate, polyacrylamide, maleic anhydride, methylvinyl ether copolymers, polyvinyl alcohol, and polyvinylpyrrolidone.

2. The composition of claim 1, wherein the zeolite is selected from the group consisting of analcime, chabazite, clinoptilolite, heulandite, and natrolite.

3. The composition of claim 1, further comprising diatomaceous earth.

4. The composition of claim 1, wherein the polymeric material is selected from the group consisting of hydroxyethylcellulose, carboxymethylhydroxyethylcellulose and guar gum.

5. The composition of claim 1, wherein the polymeric material comprises hydroxyethylcellulose.

6. The composition of claim 1, wherein the polymeric material is selected from the group consisting of welan gum, xanthan gum, galactomannan gums, succinoglycan gums, scieroglucan gums, and cellulose and its derivatives.

7. The composition of claim 1, further comprising a dispersant present from about 1 to 18% by weight of the composition selected from the group consisting of sulfonated styrene maleic anhydride copolymer, sulfonated vinyltoluene maleic anhydride copolymer, sodium naphthalene sulfonate condensed with formaldehyde, sulfonated acetone condensed with formaldehyde, lignosulfonates and interpolymers of acrylic acid, allyloxybenzene sulfonate, allyl sulfonate and non-ionic monomers.

8. The wellbore spacer composition of claim 1, wherein the composition has a 300/3 ratio of from 2 to 6.

9. A composition for forming a wellbore spacer fluid comprising:
   a zeolite present from about 60 to 70% by weight of the composition, the zeolite being represented by the formula:

$M_{a/n}[(AlO_2)_a(SiO_2)_b] \cdot xH_2O$ where
   M represents one or more cations selected from the group consisting of Na, K, Mg, Ca, Sr, Li, Ba, NH$_4$, CH$_3$NH$_3$, (CH$_3$)$_3$NH, (CH$_3$)$_4$N, Ga, Ge and P;
   n represents the cation valence;
   the ratio of b:a is in a range of from greater than or equal to 1 to less than or equal to 5; and
   x represents the number of moles of water entrained into the zeolite framework;
   a clay present from about 20 to 30% by weight of the composition selected from the group consisting of kaolinites, montmorillonite, bentonite, hydrous micas, attapulgite, sepiolite, and laponite; and
   a dispersant present from about 1 to 18% by weight of the composition selected from the group consisting of sodium naphthalene sulfonate condensed with formaldehyde, sulfonated styrene maleic anhydride copolymer, sulfonated vinyltoluene maleic anhydride copolymer, sulfonated acetone condensed with formaldehyde, lignosulfonates and interpolymers of acrylic acid, allyloxybenzene sulfonate, allyl sulfonate and non-ionic monomers.

10. The composition of claim 9, wherein the zeolite is selected from the group consisting of analcime, chabazite, clinoptilolite, heulandite, and natrolite.

11. The composition of claim 9, further comprising diatomaceous earth.

12. The composition of claim 9, further comprising a polymeric material present from about 1 to 3% by weight of the composition selected from the group consisting of hydroxyethylcellulose, carboxymethylhydroxyethylcellulose, guar gum, welan gum, xanthan gum, galactomannan gums, succinoglycan gums, scleroglucan gums, and cellulose.

13. The wellbore spacer composition of claim 9, wherein the composition has a 300/3 ratio of from 2 to 6.

14. A composition comprising:
a combination of a dry mix, a weighting material, a carrier fluid and a surfactant, wherein:
(1) the dry mix comprises:
a zeolite present from about 60 to 70% by weight of the dry mix, the zeolite being represented by the formula:

$$M_{a/n}[(AlO_2)_a(SiO_2)_b] \cdot xH_2O$$

where
M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P;
n represents the cation valence;
the ratio of b:a is in a range of from greater than or equal to 1 to less than or equal to 5; and
x represents the number of moles of water entrained into the zeolite framework; and
a clay present from about 20 to 30% by weight of the dry mix selected from the group consisting of kaolinites, montmorillonite, bentonite, hydrous micas, attapulgite, sepiolite, and laponite:
(2) the weighting material is selected from the group consisting of barite, hematite, manganese tetraoxide, ilmenite and calcium carbonate; and
(3) the surfactant is selected from the group consisting of:
(a) an ethoxylated alcohol ether sulfate of the formula:

$$H(CH_2)_a(OC_2H_4)_bOSO_3^-NH_4^+$$

wherein a is an integer in the range of from about 6 to about 10 and b is an integer in the range of from about 3 to about 10;
(b) a sodium salt of α-olefinic sulfonic acid which is a mixture of compounds of the formulas:

$$X[H(CH_2)_n\text{—}C=C\text{—}(CH_2)_mSO_3Na]$$

and $$Y[H(CH_2)_p\text{—}COH\text{—}(CH_2)_qSO_3Na]$$

wherein:
n and m are individually integers in the range of from about 6 to about 16;
p and q are individually integers in the range of from about 7 to about 17;
and
X and Y are fractions with the sum of X and Y being 1;
(c) a composition having the formula:

$$H(CH_2)_a(OC_2H_4)_3OSO_3Na$$

wherein:
a is an integer in the range of from about 6 to about 10;
(d) oxyalkylated sulfonate;
(e) an alcohol ether sulfonate of the formula:

$$H(CH_2)_a(OC_2H_4)_bSO_3NH_4^+$$

wherein:
a is an integer in the range of from about 6 to about 10; and
b is an integer in the range of from about 3 to about 10;
(f) cocoamine betaine;
(g) an alkyl or alkene amidopropyl betaine having the formula:

$$R\text{—}CONHCH_2CH_2CH_2N^+(CH_3)_2CH_2CO_2^-$$

wherein R is a radical selected from the group of decyl, cocoyl, lauryl, cetyl and oleyl; and
(h) an alkyl or alkene amidopropyl dimethylamine oxide surfactant having the formula:

$$R\text{—}CONHCH_2CH_2CH_2N^+(CH_3)_2O^-$$

wherein R is a radical selected from the group of decyl, cocoyl, lauryl, cetyl and oleyl.

15. The composition of claim 14, wherein the zeolite is selected from the group consisting of analcime, chabazite, clinoptilolite, heulandite, and natrolite.

16. The composition of claim 14, wherein the carrier fluid comprises a fluid selected from the group consisting of an aqueous fluid, hydrocarbon-based liquids, emulsions, acids and mixtures thereof.

17. The composition of claim 14, wherein the carrier fluid comprises water.

18. The composition of claim 14, further comprising diatomaceous earth.

19. The composition of claim 14, further comprising a polymeric material present from about 1 to 3% by weight of the dry mix selected from the group consisting of hydroxyethylcellulose, carboxymethylhydroxyethylcellulose, guar gum, welan gum, xanthan gum, galactomannan gums, succinoglycan gums, seleroglucan gums, and cellulose.

20. The wellbore spacer composition of claim 14, wherein the composition has a 300/3 ratio of from 2 to 6.

21. A composition comprising:
a combination of a dry mix, a weighting material and a carrier fluid, wherein:
(1) the dry mix comprises:
a zeolite present from about 60 to 70% by weight of the dry mix, the zeolite being represented by the formula:

$$M_{a/n}[(AlO_2)_a(SiO_2)_b] \cdot xH_2O$$

where
M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P;
n represents the cation valence;
the ratio of b:a is in a range of from greater than or equal to 1 to less than or equal to 5; and
x represents the number of moles of water entrained into the zeolite framework; and
a clay present from about 20 to 30% by weight of the dry mix selected from the group consisting of kaolinites, montmorillonite, bentonite, hydrous micas, attapulgite, sepiolite, and laponite; and
a polymeric material present from about 1 to 3% by weight of the dry mix selected from the group consisting of hydroxyethylcellulose, cellulose, carboxyethylcellulose, carboxymethylcellulose, carboxymethylhydroxyethylcellulose, hydroxypropylcellulose, methyihydroxypropylcellulose, methylcellulose, ethylcellulose, propylcellulose, ethylcarboxymethylcellulose, methylethylcellulose, hydroxypropylmethylcellulose, starch, guar gum, locust bean gum, tara, konjak, karaya gum, welan gum, xanthan gum, galactomannan gums, succinoglycan gums, scleroglucan gums, tragacanth gum, arabic gum, ghatti gum, tamarind gum, carrageenan, carboxymethyl guar, hydroxypropyl guar, carboxymethyihydroxypropyl guar, polyacrylate, polymethacrylate, polyacrylamide, maleic anhydride, methylvinyl ether copolymers, polyvinyl alcohol, and polyvinylpyrrolidone; and (2) the weighting material is selected from the group consisting of barite, hematite, manganese tetraoxide, ilmenite and calcium carbonate.

22. The composition of claim 21, wherein the carrier fluid comprises a fluid selected from the group consisting of an aqueous fluid, hydrocarbon-based liquids, emulsions, acids and mixtures thereof.

23. The composition of claim 22, wherein the carrier fluid comprises water.

24. The composition of claim 21, wherein the carrier fluid comprises from about 45 to 95% by volume of the composition.

25. The composition of claim 21, wherein the carrier fluid comprises from about 65 to 75% by volume of the composition.

26. The composition of claim 21, further comprising a surfactant selected from the group consisting of nonylphenol ethoxylates, alcohol ethoxylates, sugar lipids, α-olefinsulfonates, alkylpolyglycosides, alcohol sulfates, salts of ethoxylated alcohol sulfates, alkyl amidopropyl dimethylamine oxides and alkene amidopropyl dimethylamine oxides.

27. The composition of claim 26, wherein the surfactant is selected from the group consisting of:

(a) a sodium salt of α-olefinic sulfonic acid which is a mixture of compounds of the formulas:

$X[H(CH_2)_n—C=C—(CH_2)_m SO_3Na]$ and $Y[H(CH_2)_p—COH—(CH_2)_q SO_3Na]$ wherein:
n and m are individually integers in the range of from about 6 to about 16;
p and q are individually integers in the range of from about 7 to about 17; and
X and Y are fractions with the sum of X and Y being 1;

(b) a composition having the formula:

$H(CH_2)_a(OC_2H_4)_3 OSO_3Na$ wherein:
a is an integer in the range of from about 6 to about 10;

(c) oxyalkylated sulfonate;

(d) an alcohol ether sulfonate of the formula:

$H(CH_2)_a(OC_2H_4)_b SO_3NH_4^+$ wherein:
a is an integer in the range of from about 6 to about 10; and
b is an integer in the range of from about 3 to about 10;

(e) cocoamine betaine;

(f) an ethoxylated alcohol ether sulfate of the formula:

$H(CH_2)_a(OC_2H_4)_b OSO_3^- NH_4^+$ wherein a is an integer in the range of from about 6 to about 10 and b is an integer in the range of from about 3 to about 10;

(g) an alkyl or alkene amidopropyl betaine having the formula:

$R—CONHCH_2CH_2CH_2N^+(CH_3)_2CH_2CO_2^-$ wherein R is a radical selected from the group of decyl, cocoyl, lauryl, cetyl and oleyl; and (h) an alkyl or alkene amidopropyl dimethylamine oxide surfactant having the formula:

$R—CONHCH_2CH_2CH_2N^+(CH_3)_2O^-$ wherein R is a radical selected from the group of decyl, cocoyl, lauryl, cetyl and oleyl.

28. The composition of claim 21, wherein the composition has a 300/3 ratio of from 2 to 6.

29. A composition comprising:
a combination of a dry mix, a weighting material and a carrier fluid, wherein:

(1) the dry mix comprises:
a zeolite present from about 60 to 70% by weight of the dry mix, the zeolite being represented by the formula:

$M_{a/n}[(AlO_2)_a(SiO_2)_b] \cdot xH_2O$ where
M represents one or more cations selected from the group consisting of Na, K, Mg, Ca, Sr, Li, Ba, NH$_4$, CH$_3$NH$_3$, (CH$_3$)$_3$NH, (CH$_3$)$_4$N, Ga, Ge and P;
n represents the cation valence;
the ratio of b:a is in a range of from greater than or equal to 1 to less than or equal to 5; and
x represents the number of moles of water entrained into the zeolite framework;

a clay present from about 20 to 30% by weight of the dry mix selected from the group consisting of kaolinites, montmorillonite, bentonite, hydrous micas, attapulgite, sepiolite, and laponite; and a dispersant present from about 1 to 18% by weight of the dry mix selected from the group consisting of sodium naphthalene sulfonate condensed with formaldehyde, sulfonated styrene maleic anhydride copolymer, sulfonated vinyltoluene maleic anhydride copolymer, sulfonated acetone condensed with formaldehyde, lignosulfonates and interpolymers of acrylic acid, allyloxybenzene sulfonate, allyl sulfonate and non-ionic monomers; and (2) the weighting material is selected from the group consisting of barite, hematite, manganese tetraoxide, ilmenite and calcium carbonate.

30. The composition of claim 29, wherein the carrier fluid comprises a fluid selected from the group consisting of an aqueous fluid, hydrocarbon-based liquids, emulsions, acids and mixtures thereof.

31. The composition of claim 29, wherein the carrier fluid comprises water.

32. The composition of claim 29, further comprising a surfactant selected from the group consisting of nonyiphenol ethoxylates, alcohol ethoxylates, sugar lipids, α-olefinsulfonates, alkylpolyglycosides, alcohol sulfates, salts of ethoxylated alcohol sulfates, alkyl amidopropyl dimethylamine oxides and alkene amidopropyl dimethylamine oxides.

33. The composition of claim 32, wherein the surfactant is selected from the group consisting of:

(a) a sodium salt of α-olefinic sulfonic acid which is a mixture of compounds of the formulas:

$X[H(CH_2)_n—C=C—(CH_2)_m SO_3Na]$ and $$Y[H(CH_2)_p\text{—}COH\text{—}(CH_2)_qSO_3Na]$$

wherein:
  n and m are individually integers in the range of from about 6 to about 16;
  p and q are individually integers in the range of from about 7 to about 17; and
  X and Y are fractions with the sum of X and Y being 1;
(b) a composition having the formula:

$$H(CH_2)_a(OC_2H_4)_3OSO_3Na$$

wherein:
  a is an integer in the range of from about 6 to about 10;
(c) oxyalkylated sulfonate;
(d) an alcohol ether sulfonate of the formula:

$$H(CH_2)_a(OC_2H_4)_bSO_3NH_4^+$$

wherein:
  a is an integer in the range of from about 6 to about 10; and
  b is an integer in the range of from about 3 to about 10;
(e) cocoamine betaine;
(f) an ethoxylated alcohol ether sulfate of the formula:

$$H(CH_2)_a(OC_2H_4)_bOSO_3^-NH_4^+$$

wherein a is an integer in the range of from about 6 to about 10 and b is an integer in the range of from about 3 to about 10;
(g) an alkyl or alkene amidopropyl betaine having the formula:

$$R\text{—}CONHCH_2CH_2CH_2N^+(CH_3)_2CH_2CO_2^-$$

wherein R is a radical selected from the group of decyl, cocoyl, lauryl, cetyl and oleyl;
and
(h) an alkyl or alkene amidopropyl dimethylamine oxide surfactant having the formula:

$$R\text{—}CONHCH_2CH_2CH_2N^+(CH_3)_2O^-$$

wherein R is a radical selected from the group of decyl, cocoyl, lauryl, cetyl and oleyl.

34. The composition of claim 29, wherein the composition has a 300/3 ratio of from 2 to 6.

* * * * *